US010237721B2

United States Patent
Gupta et al.

(10) Patent No.: US 10,237,721 B2
(45) Date of Patent: Mar. 19, 2019

(54) METHODS, SYSTEMS, AND COMPUTER READABLE MEDIA FOR VALIDATING A REDIRECT ADDRESS IN A DIAMETER MESSAGE

(71) Applicant: Oracle International Corporation, Redwood Shores, CA (US)

(72) Inventors: Nitin Gupta, Bangalore (IN); Shashikiran Bhalachandra Mahalank, Bangalore (IN); Venkatesh Aravamudhan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/408,155

(22) Filed: Jan. 17, 2017

(65) Prior Publication Data

US 2018/0205698 A1    Jul. 19, 2018

(51) Int. Cl.
*H04W 4/00*   (2018.01)
*H04W 8/18*   (2009.01)
*H04W 8/20*   (2009.01)
*H04L 29/06*  (2006.01)
*H04L 29/08*  (2006.01)
(Continued)

(52) U.S. Cl.
CPC ........ *H04W 8/18* (2013.01); *G06F 17/30516* (2013.01); *H04L 65/1006* (2013.01); *H04L 67/146* (2013.01); *H04M 15/64* (2013.01); *H04M 15/66* (2013.01); *H04W 8/205* (2013.01);
(Continued)

(58) Field of Classification Search
CPC ......... H04W 4/00–4/203; H04W 4/24; H04W 4/26; H04W 48/00; H04W 48/17; H04W 48/18; H04W 48/20
See application file for complete search history.

(56) References Cited

U.S. PATENT DOCUMENTS 7,043,754 B2    5/2006  Arnouse
8,045,956 B2    10/2011 Sun et al.
(Continued)

FOREIGN PATENT DOCUMENTS

EP        1 067 492 A2    1/2001

OTHER PUBLICATIONS

Final Office Action for U.S. Appl. No. 15/376,631 (dated Nov. 28, 2017).
(Continued)

*Primary Examiner* — San Htun
(74) *Attorney, Agent, or Firm* — Jenkins, Wilson, Taylor & Hunt, P.A.

(57) ABSTRACT

Methods, systems, and computer readable media for validating a redirect address in a Diameter message are disclosed. One method occurs at a Diameter node, e.g., a Diameter routing agent (DRA) node, a packet data network (PDN) gateway, a policy and charging enforcement function (PCEF) node, or a Diameter edge agent (DEA) node. The method includes receiving a message containing a redirect address that appears to be associated with a top-up server for facilitating a subscriber to recharge or top-up an account balance. The method also includes determining whether the redirect address is valid by querying, using a subscriber related identifier, a data structure containing one or more addresses. The method further includes performing at least one action based on the determining.

13 Claims, 6 Drawing Sheets

(51) Int. Cl.
*H04M 15/00* (2006.01)
*G06F 17/30* (2006.01)
*H04L 29/12* (2006.01)

(52) U.S. Cl.
CPC ........ *H04L 61/103* (2013.01); *H04L 61/6022* (2013.01)

(56) References Cited

U.S. PATENT DOCUMENTS

| | | |
|---|---|---|
| 8,615,217 B2 | 12/2013 | Ravishankar et al. |
| 8,879,431 B2 | 11/2014 | Ridel et al. |
| 9,060,263 B1 | 6/2015 | Carames et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 2003/0087647 A1 | 5/2003 | Hurst |
| 2004/0140908 A1 | 7/2004 | Gladwin et al. |
| 2007/0174082 A1 | 7/2007 | Singh |
| 2008/0222038 A1 | 9/2008 | Eden |
| 2009/0045251 A1 | 2/2009 | Jaiswal et al. |
| 2009/0195349 A1 | 8/2009 | Frader-Thompson et al. |
| 2010/0062789 A1 | 3/2010 | Agarwal et al. |
| 2010/0100958 A1* | 4/2010 | Jeremiah ................ G06F 21/36 726/22 |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0173122 A1 | 7/2011 | Singhal |
| 2011/0191835 A1 | 8/2011 | Hawkes et al. |
| 2011/0225091 A1 | 9/2011 | Plastina et al. |
| 2011/0307381 A1 | 12/2011 | Kim et al. |
| 2012/0099715 A1* | 4/2012 | Ravishankar ....... H04L 12/1407 379/114.01 |
| 2012/0131121 A1 | 5/2012 | Snyder et al. |
| 2012/0203663 A1 | 8/2012 | Sinclair et al. |
| 2014/0199961 A1 | 7/2014 | Mohammed et al. |
| 2014/0280645 A1 | 9/2014 | Shuman et al. |
| 2015/0012415 A1* | 1/2015 | Livne ..................... G06Q 30/04 705/39 |
| 2015/0188979 A1* | 7/2015 | Almeras ................. H04L 67/02 709/217 |
| 2016/0088461 A1 | 3/2016 | Jiang |
| 2016/0156647 A1 | 6/2016 | Engel et al. |
| 2016/0269566 A1* | 9/2016 | Gundamaraju ....... H04M 15/66 |
| 2016/0292687 A1 | 10/2016 | Kruglick |
| 2017/0345006 A1 | 11/2017 | Kohli |
| 2018/0020324 A1 | 1/2018 | Beauford |
| 2018/0109953 A1 | 4/2018 | He |
| 2018/0167906 A1 | 6/2018 | Chellamani et al. |

OTHER PUBLICATIONS

Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).
Commonly-assigned, co-pending U.S. Appl. No. 15/636,118 for "Methods, Systems, and Computer Readable Media for Validating User Equipment (UE) Location," (Unpublished, filed Jun. 28, 2017).
Non-Final Office Action for U.S. Appl. No. 15/376,631 (dated Jun. 16, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Commonly-assigned, co-pending U.S. Appl. No. 15/376,631 for "Methods, Systems, and Computer Readable Media for Validating Subscriber Location Information," (Unpublished, filed Dec. 12, 2016).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks" http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage 1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Non-Final Office Action for U.S. Appl. No. 13/047,287 (dated Jun. 6, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"NET-NET Diameter Director," http://www.oracle.com/us/industries/communications/net-net-diameter-director-ds-1985034.pdf, pp. 1-9 (Copyright 2012).

(56) References Cited

OTHER PUBLICATIONS

"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Myers, "SmartSynch Introduces Innovative 'DCX' Smart Grid Solution at DistrbuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Hakala et al., "Diameter Credit-Control Application," RFC 4006, pp. 1-115 (Aug. 2005).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
Examiner's Answer for U.S. Appl. No. 13/047,287 (Feb. 26, 2018).
Advisory Action Before the Filing of an Appeal Brief and AFCP 2.0 Decision for U.S. Appl. No. 15/376,631 (dated Feb. 2, 2018).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).
Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpublished, filed Jul. 13, 2018).
Commonly-assigned, co-pending U.S. Appl. No. 16/024,422 for "Methods, Systems, and Computer Readable Media for Network Node Validation," (Unpublished, filed Jun. 29, 2018).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Patent Application No. PCT/US2018/043985 (dated Oct. 9, 2018).

\* cited by examiner

METHODS, SYSTEMS, AND COMPUTER READABLE MEDIA FOR VALIDATING A REDIRECT ADDRESS IN A DIAMETER MESSAGE

TECHNICAL FIELD

The subject matter described herein relates to methods and systems for preventing fraud related to communications networks. More particularly, the subject matter described herein relates to methods, systems, and computer readable media for validating a redirect address in a Diameter message.

BACKGROUND

Communications networks can be targeted by malicious actors for a variety of reasons, e.g., financial gain, espionage, or political aims. For example, vulnerabilities associated with Diameter networks allow some entities to commit revenue fraud and/or steal personal subscriber information. When such issues occur, many times an innocent party may be held responsible for rectifying and/or mitigating the damage. While network operators generally use security appliances, firewalls, and/or other devices to help prevent unauthorized access to their networks and customers, numerous issues can still exist within their networks due to the inherent security issues associated with protocols and/or procedures used in these networks.

SUMMARY

Methods, systems, and computer readable media for validating a redirect address in a Diameter message are disclosed. One method occurs at a Diameter node, e.g., a Diameter routing agent (DRA) node, a packet data network (PDN) gateway, a policy and charging enforcement function (PCEF) node, or a Diameter edge agent (DEA) node. The method includes receiving a message containing a redirect address that appears to be associated with a top-up server for facilitating a subscriber to recharge or top-up an account balance. The method also includes determining whether the redirect address is valid by querying, using a subscriber related identifier, a data structure containing one or more addresses. The method further includes performing at least one action based on the determining.

One system includes a Diameter node. The Diameter node includes at least one processor and memory. The Diameter node is configured for receiving a message containing a redirect address that appears to be associated with a top-up server for facilitating a subscriber to recharge or top-up an account balance; determining whether the redirect address is valid by querying, using a subscriber related identifier, a data structure containing one or more addresses; and performing at least one action based on the determining.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms 'node' refers to a physical computing platform including one or more processors and memory.

As used herein, the terms 'engine', 'function' or 'module' refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for validating a redirect address in a Diameter message. Vulnerabilities exist in various communications networks, including mobile communications networks. For example, a malicious network node may be programmed or otherwise configured to generate and send a fraudulent Diameter message (e.g., a Diameter credit control answer (CCA) message) to a packet data network (PDN) gateway or other node serving one or more subscribers. In this example, the fraudulent message may provide redirect address information for communicating with an alleged top-up server that is controlled by a malicious actor. Since such networks do not validate such messages or redirect address information therein, a PDN gateway or other node may send the fraudulent message or the redirect address therein to a user device. The user device may connect to the alleged top-up server using the redirect address, whereby a user may inadvertently give money and/or personal information to the malicious actor controlling the alleged top-up server.

In accordance with some aspects of the subject matter described herein, techniques, methods, systems, or mechanisms are disclosed for validating a redirect address in a Diameter message. For example, a Diameter routing agent or Diameter edge agent (DRA/DEA) node or a PDN gateway may use an address validation algorithm and/or rules for determining whether redirect address information is valid. In some embodiments, an address validation algorithm may involve querying, using a subscriber related identifier, a data structure containing one or more redirect addresses and/or related information. In this example, the data structure may be indexed and/or searchable using one or more subscriber related identifiers, such as a network identifier, a subscriber identifier, and/or a UE identifier. In some embodiments, if redirect address information or a related message is determined to be invalid or likely to be invalid (e.g., fraudulent, erroneous, inappropriate, etc.), the DRA/DEA node may perform one or more actions, such as discarding the message, modifying the message, notifying a network operator of potential malicious activities, and/or other mitigating actions.

Advantageously, by validating a redirect address in various messages and performing one or more mitigating actions when redirect address information is determined to be invalid or likely to be invalid, malicious activities and their negative consequences (e.g., revenue fraud) can be avoided and/or prevented.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
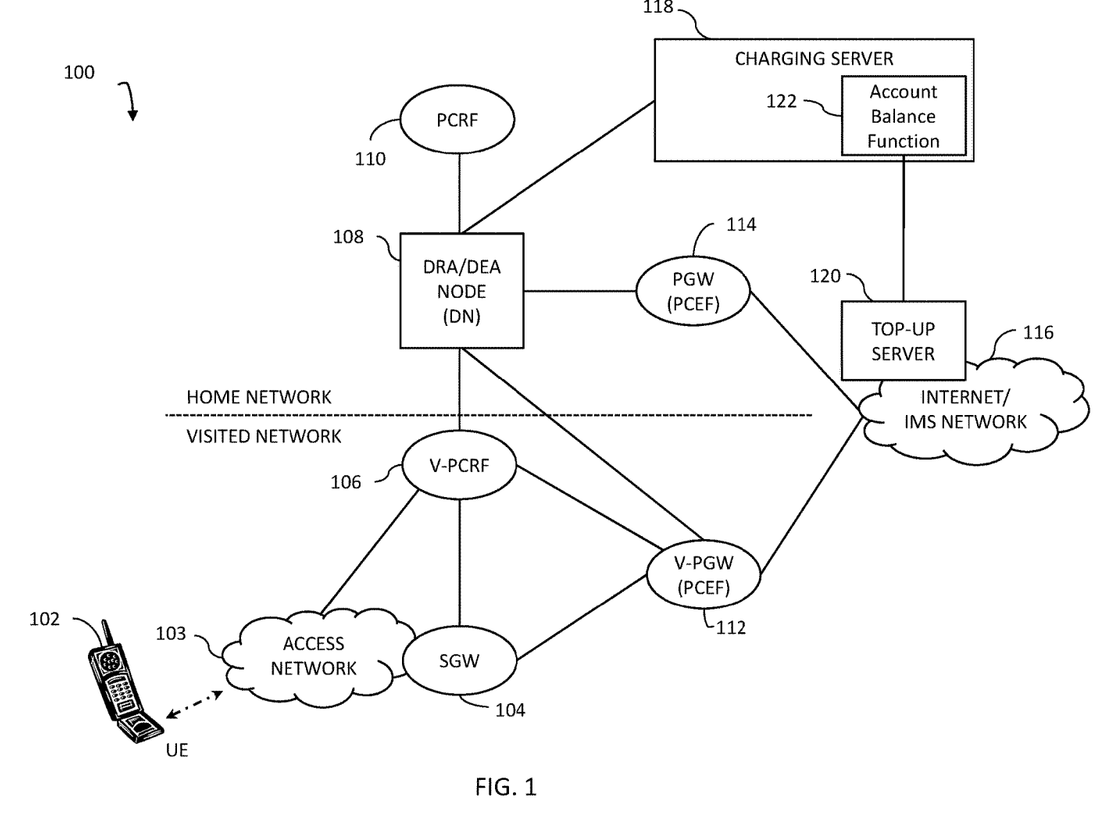
FIG. 1 is a diagram illustrating an example communications environment for validating a redirect address in a Diameter message.

FIG. 1 is a diagram illustrating another example communications environment 100 for validating a redirect address in a Diameter message. FIG. 1 includes a UE 102 (e.g., a mobile device, a tablet computing platform, or a smartphone) capable of roaming or moving between different portions of communications environment 100. In some embodiments, communications environment 100 may include one or more nodes associated with a fourth generation (4G) network, a long term evolution (LTE) network, an Internet protocol (IP) Multimedia Core Network Subsystem (IMS) network, a LTE-advanced network, and/or an evolved packet core (EPC) network.

Communications environment 100 may include a home network (e.g., an HPLMN) and a visited network (e.g., a VPLMN). The home network may be associated with UE 102 and may be the UE's default network, while the visited network may be a network that UE 102 may use or may attempt to use while roaming outside the home network's coverage area. In some embodiments, the home network and the visited network may include nodes for communicating with an external network, such as Internet/IMS network 116.

The home network may include various nodes, e.g., a PDN gateway (PGW) 114, a DRA/DEA node (DN) 108, a policy and charging rules function (PCRF) 110, and/or a charging server 118. In some embodiments, a home network may be configured as a subscriber's default roaming provider. In some embodiments, a home network may be configured to allow a subscriber to change his roaming provider, e.g., for a certain or specified period of time.

In some embodiments, a home network and/or its related nodes may be configured to handle data services (e.g., Internet access), e.g., even when its subscribers are using a visited network for voice services. For example, a home network may handle data services for a roaming subscriber by routing a data flow service request through its network regardless of whether a visited network can provide the same services quicker or more cheaply.

In some embodiments, a home network and/or its related nodes may be configured to allow a network operator or service provider that is different from a home network's operator or service provider, referred to herein as an alternate roaming provider (ARP), to provide data services (e.g., Internet access). For example, an ARP may provide data services at lower rates than a subscriber's home network and may also help in alleviating network load or congestion in the subscriber's home network by handling some subscribers' IP traffic.

PGW 114 may be any suitable entity for providing access to Internet/IMS network 116 or other data networks. For example, a serving gateway (SGW) 104 may communicate with PGW 114 to provide communications with an application server or other server located in Internet/IMS network 116. In some embodiments, if SGW 104 receives a signaling message indicating that a roaming subscriber cannot receive data services via an ARP, SGW 104 may route IP traffic and/or related messages destined for Internet/IMS network 116 via PGW 114 in the home network.

In some embodiments, PGW 114 may include a policy and charging enforcement function (PCEF) and may manage and enforce policy and charging control (PCC) rules provided by PCRF 110. For example, rules may be provided for each service data flow (e.g., one or more packet flows that match certain criteria, such as a subscriber-based media traffic flow) and/or UE 102 attempting to use PGW 114. In this example, PGW 114 may control access to external networks and charge for access of nodes in Internet/IMS network 116 based on policy rules received from PCRF 110 (e.g., via an IP-CAN session).

Internet/IMS network 116 may include various nodes (e.g., application servers) that provide services that require subscriber credits. For example, UE 102 or related PGW 114 may request authorization and/or credits to use a media server. In this example, PGW 114 may request PCC rules and/or authorization from PCRF 110 and may request credits from charging server 118.

In some embodiments, top-up server 120 may be located in Internet/IMS network 116. Top-up server 120 may be any suitable entity capable of recharging or topping up credits in a subscriber's account. For example, top-up server 120 may provide a front-end interface, a web portal, or other user interface for allowing a subscriber to interact with an account balance function 122 in charging server 118 for obtaining information about the subscriber's account and/or for recharging or topping-up the subscriber's account. In this example, the subscriber may use top-up server 120 to purchase credits for network usage and/or various services via account balance function 122 or other functionality in charging server 118. In some embodiments, communications environment 100 may utilize multiple top-up servers, where one or more top-up servers may be accessible depending on various factors, e.g., subscriber, service tier, time of day, UE type, network load, UE location, etc.

Charging server 118 may be any suitable entity for performing one or more charging control functions (e.g., one or more PCC rules). For example, charging server 118 may include an online charging server (OCS) and/or and offline charging server. In some embodiments, charging server 118 may be a stand-alone node, or may be co-located or integrated with one or more nodes in communications environment 100, e.g., PCRF 110.

In some embodiments, charging server 118 may inform PGW 114 and/or other nodes about top-up server 120 for recharging or topping up a subscriber's account, e.g., when a subscriber's credits are exhausted or fall below a particular threshold. For example, charging server 118 may use CCA messages and/or one or more redirect AVPs to provide redirect addresses to UE 102 and may be used by a subscriber to communicate with top-up server 120.

PCRF 110 may be any suitable entity for creating, selecting, or otherwise determining charging rules and/or other policies (e.g., one or more PCC rules). For example, PCRF 110 may be a stand-alone node, e.g., a policy server or a multimedia policy engine (MPE), or may be co-located or integrated with one or more nodes in communications environment 100, e.g., DN 108 or charging server 118. PCRF 110 may inform PGW 114, through the use of PCC rules, on the treatment of each SDF that is under PCC control, in accordance with policy decisions.

DN 108 may be any suitable entity (e.g., one or more computing platforms or devices) for receiving, processing, routing, and/or forwarding Diameter messages. For example, DN 108 may route and/or forward various Diameter messages between nodes in communications environment 100.

In some embodiments, DN 108 may include functionality for facilitating communications between nodes in the home network and nodes in the visited network. For example, Diameter messages and/or policy related messages may be sent from PCRF 110 to visitor PGW (V-PGW) 112 via DN 108. While only DN 108 is depicted in communications environment 100, it will be appreciated that multiple DRNs may be used to facilitate communication between nodes in communications environment 100.

In some embodiments, DN 108 may include functionality for filtering and/or validating messages. For example, DN 108 may analyze header and/or payload information in Diameter signaling messages and may determine how to process or route the signaling messages.

In some embodiments, DN 108 may include functionality for identifying messages that contain redirect address information, such as a Diameter credit control answer (CCA) initial (CCA-I) messages and/or CCA update (CCA-U) messages. For example, DN 108 may be configured to use filters or other techniques to inspect a communications interface (e.g., a Gy interface associated with charging server 118 or a Gx interface associated with PCRF 110) to identify relevant messages. In another example, DN 108 may be configured to use filters or other techniques to inspect command codes to identify relevant messages. In another example, DN 108 may be configured to use filters or other techniques to inspect payloads and/or attribute value pairs (AVP) therein for one or more redirect addresses and/or other related information.

Examples of some AVPs that DN 108 may look for in Diameter messages include a final unit indication (FUI) AVP, a final unit action (FUA) AVP, a redirect-server AVP and/or AVPs nested therein, such as a redirect-address-type AVP, a redirect-server-address AVP. Additional information about these AVPs and/or charging control related architecture can be found in RFC 4006, 3GPP TS 29.212, and 3GPP TS 32.299; the disclosures of which are incorporated herein by reference in their entireties.

In some embodiments, redirect address information may include any information usable for identifying and/or communicating with top-up server 120 (e.g., a server capable of recharging or topping up a subscriber's account for network usage and/or other services). For example, redirect address information may include an Internet protocol (IP) version 4 address, an IP version 6 address, a uniform resource locator (URL), or a session initiation protocol (SIP) uniform resource identifier (URI).

In some embodiments, DN 108 may include functionality for validating redirect addresses. For example, DN 108 may be configured to analyze a payload portion of a signaling message and retrieve redirect address information from the signaling message. In this example, DN 108 may perform an address validation analysis that includes executing one or more address validation algorithms and/or rules for determining whether the redirect address information is valid or appears to be valid.

In some embodiments, DN 108 may be configured to perform one or more actions based on an address validation analysis or a related determination. For example, in response to determining that redirect address information is valid, DN 108 may send a related message to its intended destination. In another example, in response to determining that redirect address information is invalid, DN 108 may modify a related message prior to sending the message to an appropriate destination.

In some embodiments, DN 108 may be configured to modify, delete, and/or add redirect address information. For example, if DN 108 determines that a message includes redirect address information that is invalid or likely invalid, DN 108 may discard the message and/or notify a network operator of a potentially malicious activity. In another example, if DN 108 determines that a message includes redirect address information that is valid or likely valid, DN 108 may forward the message to PGW 114 or another destination without changing the redirect address information. In yet another example, if DN 108 determines that a message should include additional and/or different redirect address information, DN 108 may modify the message to include valid redirect address information (e.g., in a redirect-server-address AVP) prior to sending the message to a destination.

The visited network may include an access network 103, a visitor PCRF (V-PCRF) 106, a SGW 104, top-up server 120, and a visitor PGW (V-PGW) 112. Access network 103 may represent a radio access network and may include various nodes for communicating with UE 102 and elements within communications environment 100. Example nodes in access network 103 may include an evolved node b (eNB) or other transceiver node, which may perform radio access functions. Access network 103, or nodes therein, may be used for communications between UE 102 and nodes in the visited network or communications environment 100. For example, an eNB or other node (e.g., SGW 104) may communicate UE-related messages (e.g., authentication or mobility related messages) to various nodes in communications environment 100.

SGW 104 represents a node or gateway for facilitating communications between access network 103 and other nodes (e.g., V-PGW 112) or networks. In some embodiments, SGW 104 may communicate user traffic to other nodes in communications environment 100.

V-PCRF 106 may be any suitable entity for creating, selecting, or otherwise determining charging rules and/or other policies (e.g., one or more PCC rules). In some embodiments, V-PCRF 106 may communicate with nodes in home network. For example, V-PCRF 106 may communicate with PCRF 110 via DN 108 to obtain PCC rules or other information for a roaming subscriber. V-PCRF 106 may inform V-PGW 112, through the use of PCC rules, on the treatment of each SDF that is under PCC control, in accordance with policy decisions.

V-PGW 112 may be any suitable entity for providing access to Internet/IMS network 116 or other data networks. In some embodiments, V-PGW 112 may include a PCEF and may manage and enforce PCC rules provided by PCRF 110 or V-PCRF 106. In some embodiments, if SGW 104 receives a signaling message indicating that a roaming subscriber can receive data services via an ARP, SGW 104 may route IP traffic and/or related messages destined for Internet/IMS network 116 via V-PGW 112 in the visited network. In some embodiments, if SGW 104 receives a signaling message indicating that a roaming subscriber cannot receive data services via an ARP, SGW 104 may route IP traffic and/or related messages destined for Internet/IMS network 116 via PGW 114 in the home network instead of via V-PGW 112.

In some embodiments, V-PGW 112 may communicate with charging server 118 via DN 108. For example, when a subscriber's credits are exhausted or fall below a particular threshold, charging server 118 may inform V-PGW 112 via DN 108 about top-up server 120 for recharging or topping up a subscriber's account. In this example, charging server 118 may use CCA messages and/or one or more redirect AVPs to provide redirect addresses for communicating with top-up server 120.

In some embodiments, V-PGW 112 and/or PGW 114 may include functionality for validating redirect addresses. For example, in lieu of DN 108 validating redirect address information or in addition to DN 108 validating redirect address information, validating redirect address information as described herein may be performed at V-PGW 112 and/or PGW 114. In this example, after receiving a Diameter message containing redirect address information, V-PGW 112 and/or PGW 114 may perform an address validation analysis that includes executing one or more address validation algorithms and/or rules for determining whether the redirect address information is valid or appears to be valid.

It will be appreciated that FIG. 1 is for illustrative purposes and that various nodes and/or modules, locations, and/or functionality described above in relation to FIG. 1 may be changed, altered, added, or removed.

Figure 2:
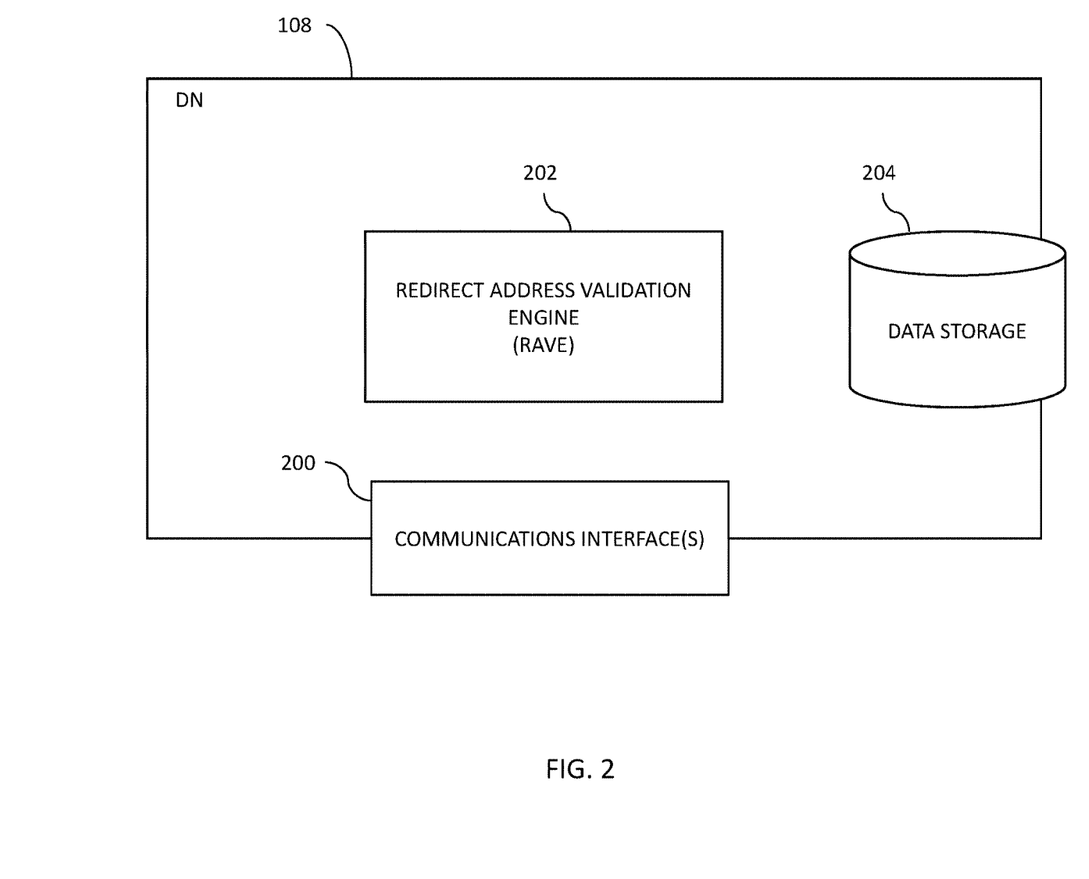
FIG. 2 is a diagram illustrating an example Diameter routing agent or Diameter edge agent (DRA/DEA) node for validating a redirect address in a Diameter message.

FIG. 2 is a diagram illustrating an example DN 108 for validating a redirect address in a Diameter message. In some embodiments, DN 108 may facilitate communications between various nodes in communications environment 100. For example, DN 108 may route or send Diameter messages between charging server 118 and PGW 114. In another example, DN 108 may act as a gateway agent for communications between nodes in a visited network (e.g., V-PGW 112 or V-PCRF 106) and nodes in a home network (e.g., PGW 114, charging server 118, or PCRF 110).

Referring to FIG. 2, DN 108 may include functionality for processing various messages. DN 108 may include one or more communications interface(s) 200 for communication with Diameter entities, e.g., 3rd Generation Partnership Project (3GPP) LTE communications interfaces and other (e.g., non-LTE) communications interfaces. For example, communications interface(s) 200 may receive or send Diameter signaling messages associated with multiple different Diameter signaling interfaces, e.g., Gx, Gxx, Rx, Sd, Sy, Gy, and/or S9.

In some embodiments, communications interface(s) 200 may be associated with one or more taps (e.g., computing platforms or devices) for intercepting and/or copying messages in communications environment 100.

DN 108 may include a redirect address validation engine (RAVE) 202. RAVE 202 may be any suitable entity (e.g., software executing on at least one processor) for performing one or more aspects associated with validating a redirect address. In some embodiments, RAVE 202 may include functionality for identifying messages that contain redirect addresses, such as CCA messages. For example, RAVE 202 may identify relevant messages by identifying particular AVPs in the messages, such as an FUI AVP, an FUA AVP, a redirect-type AVP, or a redirect-server-address AVP.

In some embodiments, RAVE 202 may include functionality for performing an address validation analysis on a message or redirect address information therein. For example, RAVE 202 may be configured to analyze a payload portion (e.g., a redirect-server-address AVP) of a Diameter message and retrieve a redirect address. In this example, RAVE 202 may perform an address validation analysis that includes executing one or more address validation algorithms and/or rules for determining whether the redirect address is valid or appears to be valid.

In some embodiments, an address validation analysis or a related address validation algorithm may include determining whether a redirect address in a message is valid (or appears valid) by querying a data structure containing one or more redirect addresses and/or related information. In this example, the data structure may be indexed and/or searchable using one or more identifiers, such as a network identifier, a subscriber identifier, and/or a UE identifier.

In some embodiments, a searchable data structure may be utilized as a whitelist. For example, a searchable data structure may contain valid redirect addresses. In this example, DN 108 or RAVE 202 therein may search the data structure looking for a match to a redirect address in a Diameter message and, if a match is found, DN 108 or RAVE 202 therein may determine that the redirect address is valid.

In some embodiments, a searchable data structure may be utilized as a blacklist. For example, a searchable data structure may contain invalid redirect addresses. In this example, DN 108 or RAVE 202 therein may search the data structure looking for a match to a redirect address in a Diameter message and, if a match is found, DN 108 or RAVE 202 therein may determine that the redirect address is invalid.

In some embodiments, RAVE 202 may be configured to perform one or more actions based on an address validation analysis or a related determination. For example, in response to determining that a redirect address is valid, RAVE 202 may send a related message to an appropriate destination (e.g., PGW 114 or V-PGW 112). In another example, in response to determining that the redirect address information is invalid, RAVE 202 may screen, filter, or discard a related message and/or may modify the message.

In some embodiments, RAVE 202 may be configured to modify, delete, and/or add redirect address information. For example, if RAVE 202 determines that a message includes a redirect address that is invalid or likely invalid, RAVE 202 may delete the message or a portion thereof and/or notify a network operator of a potentially malicious activity. In another example, if RAVE 202 determines that a message includes redirect address information that is valid or likely valid, RAVE 202 may forward the message to a destination (e.g., PGW 114) without changing the redirect address. In yet another example, if RAVE 202 determines that a message should include additional and/or different redirect address information, RAVE 202 may modify the message to include a valid redirect address prior to sending the message.

DN 108 may access (e.g., read from and/or write information to) data storage 306. Data storage 306 may be any suitable entity (e.g., one or more computer readable media or memory) for storing various data. In some embodiments, data storage 306 may include address validation rules and/or policies associated with one or more subscribers and/or network providers. Data storage 306 may include information for determining whether a redirect address is valid or invalid. Example information usable in determining whether a redirect address is valid or invalid may include a data structure containing entries that indicate associations between identifiers (e.g., network identifiers) and redirect addresses for communicating with top-up servers, such as top-up server 120.

It will be appreciated that FIG. 2 and its related description are for illustrative purposes and that DN 108 may include additional and/or different modules, components, or functionality. Further, RAVE 202 and/or related functionality described herein may be associated with different and/or additional nodes or entities. For example, V-PGW 112 and/or PGW 114 may include RAVE 202 and/or functionality for performing an address validation analysis on a message or redirect address information therein.

Figure 3:
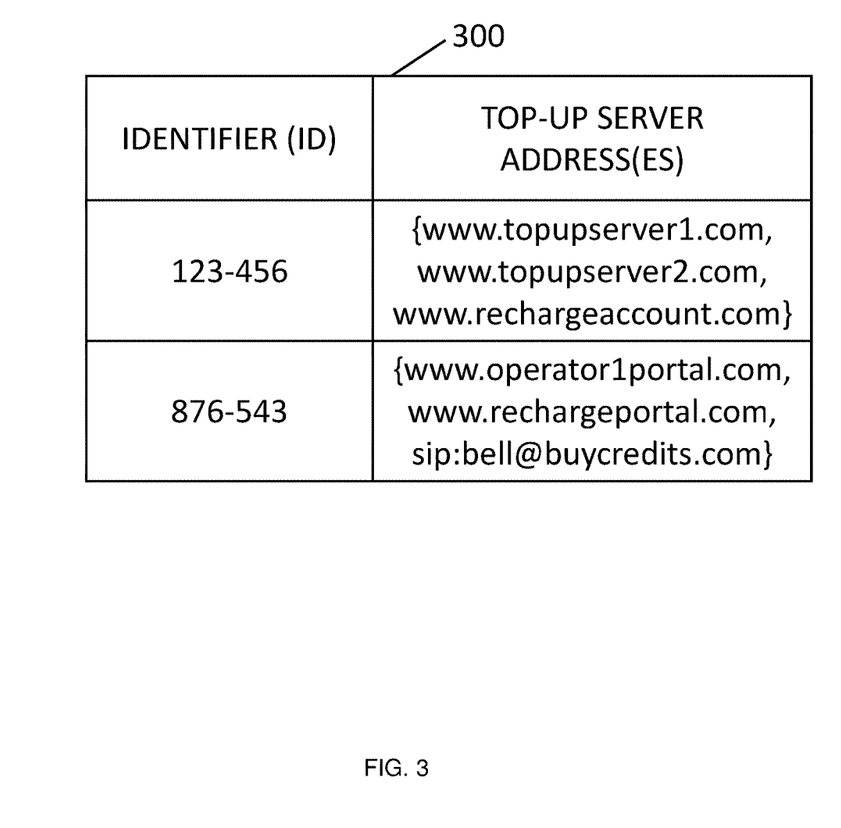
FIG. 3 is a diagram illustrating an example redirect validation information.

FIG. 3 is a diagram illustrating redirect validation information 300. Redirect validation information 300 may represent any information associated with validating redirect addresses. In some embodiments, redirect validation information 300 may be accessed and/or stored by DN 108, RAVE 202, PGW 114, and/or V-PGW 112. In some embodiments, redirect validation information 300 may be stored in data storage 204 using various data structures.

Referring to FIG. 3, redirect validation information 300 may include associations between identifiers and top-up server addresses and may be depicted using a table. For example, a table representing redirect validation information 300 may comprise columns and/or fields for identifiers and top-up server addresses.

An identifier (ID) field may comprise a value, a name, and/or a related identifier for indicating one or more top-up server addresses. For example, an ID may be a network ID, such as mobile country code (MCC) and a mobile network code (MNC). In another example, an ID may be a subscriber ID, such as a phone number. Example IDs for identifying or indicating relevant server addresses may include a network identifier, an MCC, an MNC, a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), an eUTRAN CGI (EGCI), a user device identifier, an international mobile station equipment identity (IMEI), a phone number, or an international mobile subscriber identity (IMSI).

A top-up server address(es) field may comprise one or more values, names, or text representing one or more server addresses. Example addresses may include an IP version 4 address, an IP version 6 address, a URL, or a SIP URI.

In some embodiments, redirect validation information 300 may be utilized as a whitelist, e.g., entries may include valid redirect addresses. For example, DN 108 or RAVE 202 therein may inspect redirect validation information 300 or a related data structure for determining whether a redirect address matches data therein and, if a match is found, the redirect address may be considered valid.

In some embodiments, redirect validation information 300 may be utilized as a blacklist, e.g., entries may include invalid redirect addresses. For example, DN 108 or RAVE 202 therein may inspect redirect validation information 300 or a related data structure for determining whether a redirect address matches data therein and, if a match is found, the redirect address may be considered invalid.

It will also be appreciated that redirect validation information 300 is for illustrative purposes and that additional and/or different data than that depicted may be usable for validating redirect address. Further, redirect validation information 300 may be stored or managed using various data structures and/or computer readable media.

Figure 4:
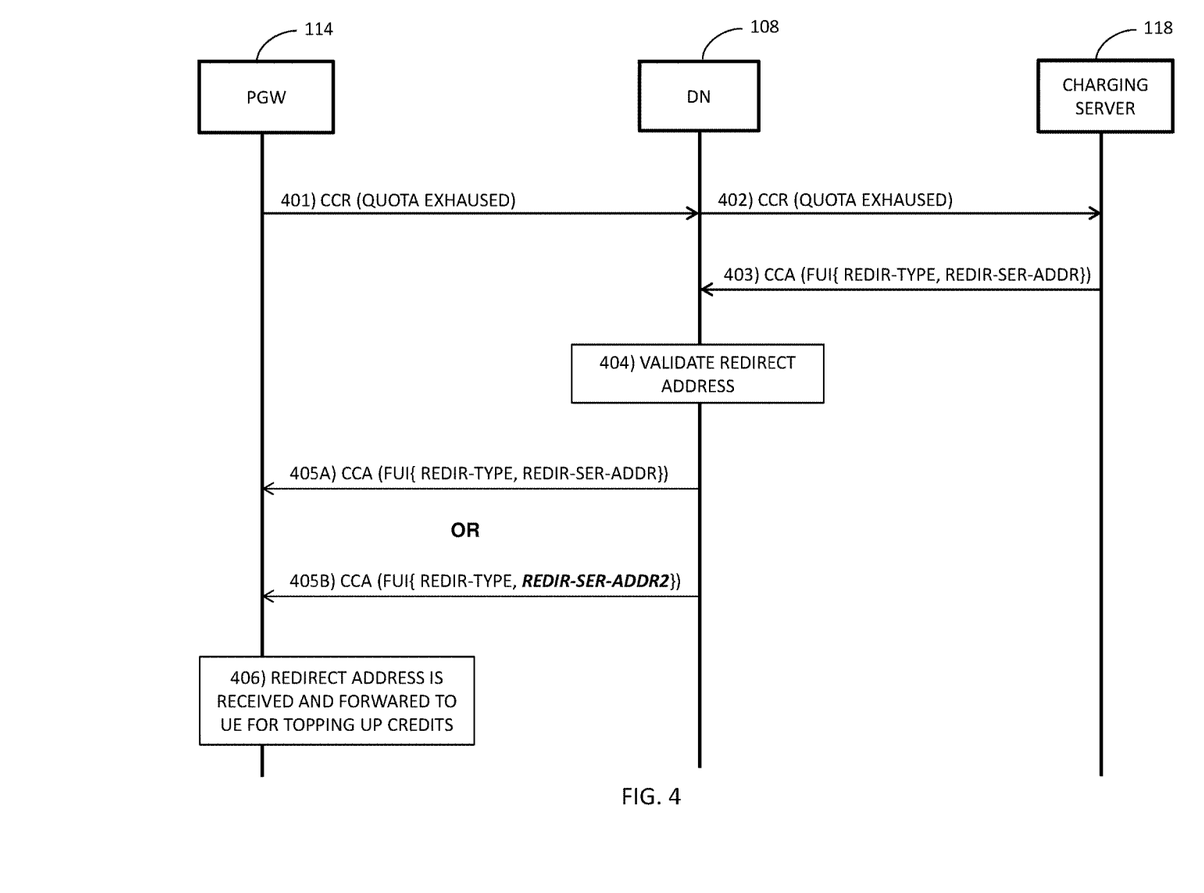
FIG. 4 is a diagram illustrating example Diameter messages associated with validating a redirect address in a Diameter message.

FIG. 4 is a diagram illustrating example Diameter messages associated with validating a redirect address in a Diameter message. In some embodiments, UE 102 may be connected to Internet/IMS network 116 using PGW 114 in a home network and may be charged credits based on some predetermined agreement. In such embodiments, during a call or session, if a UE 102 or related user exhausts or runs out of credits, PGW 114 may communicate with charging server 118 via DN 108 to obtain a redirect address and/or other information for communicating with top-up server 120 for recharging or topping up credits to continue the call or session.

Referring to FIG. 4, in step 401, a CCR message may be sent from PGW 114 to DN 108. For example, when a subscriber's credit quota is exhausted during a session with a node in Internet/IMS network 116, PGW 114 may send a CCA-U message to DN 108 destined for charging server 118.

In step 402, the CCR message may be sent from DN 108 to charging server 118. For example, DN 108 may route a CCR message to charging server 118 based on a subscriber identifier or other information.

In step 403, a CCA message may be sent from charging server 118 to DN 108. For example, after receiving a CCR message indicating that a credit quota is exhausted, charging server 118 may determine top-up server 120 should be contacted for obtaining additional credits. In this example, charging server 118 may generate and send a CCA message that includes a redirect address for communicating with top-up server 120.

In step 404, the CCA message may be received and validated at DN 108. For example, DN 108 or RAVE 202 therein may be configured to perform an address validation analysis (e.g., using one or more address validation algorithms) for determining whether the signaling message or address information therein is valid. Continuing with this example, depending on whether the redirect address is determined to be valid or invalid, DN 108 may perform one or more actions; e.g., modifying the message to replace an invalid redirect address with a valid redirect address before sending the message onward to PGW 114.

Steps 405A and steps 405B represent steps that may occur depending on whether the redirect address is valid or invalid. For example, if a redirect address is determined to valid in step 404, step 405A may occur. In another example, if a redirect address is determined to be invalid in step 404, step 405B may occur.

In step 405A, the CCA message may be sent from DN 108 to PGW 114 without modifying the redirect address. For example, after DN 108 or RAVE 202 determines that a redirect address in a Diameter message is valid, DN 108 may send the Diameter message to a destination with little or no modification to the redirect address.

In step 405B, the CCA message or a similar message may be modified to replace an invalid redirect address with a valid redirect address and then the CCA message or a similar message may be sent from DN 108 to PGW 114. For example, a network node may be configured to intercept a CCA message and may replace a valid redirect address for top-up server 120 with a redirect address for connecting to a server usable by a malicious actor to steal money or personal information from a subscriber. In this example, DN 108 or RAVE 202 may receive the CCA message and determine that the redirect address in the CCA message is invalid. Continuing with this example, DN 108 or RAVE 202 may modify the CCA message to replace the invalid redirect address with a valid redirect address for top-up server 120 before sending the CCA message to PGW 114.

In some embodiments, in response to determining that a redirect address in a Diameter message is invalid, the Diameter message may be discarded or sent to a network operator or a network management system for further analysis, e.g., instead of being routed to PGW 114. For example, a network node may be configured to send a fraudulent CCA message containing a redirect address for connecting to a server usable by a malicious actor to steal money or personal information from a subscriber. In this example, DN 108 or RAVE 202 may receive the CCA message and determine that the redirect address in the CCA message is invalid and, instead of sending the CCA message to PGW 114, DN 108 or RAVE 202 may discard the message or may notify a network operator or a network management system.

In step 406, the CCR message or a similar message may be received by PGW 114. In some embodiments, PGW 114 may forward or send a redirect address and/or other information to UE 102, where UE 102 may communicate with top-up server 120 for obtaining additional credits.

In some embodiments, where PGW 114 includes RAVE 202 or related functionality, PGW 114 or RAVE 202 therein may be configured to perform an address validation analysis (e.g., using one or more address validation algorithms) for determining whether the signaling message or address information therein is valid. In some embodiments, PGW 114 may forward or send the redirect address to UE 102 if the address information is determined to be valid. If the address information is determined to be invalid, PGW 114 may discard the signaling message, notify a network operator, and/or perform other mitigation actions.

In some embodiments, after obtaining additional credits, PGW 114 may notify charging server 118 about the additional credits and charging server 118 may notify PGW 114 to allow a credit-related traffic flow.

It will be appreciated that FIG. 4 is for illustrative purposes and that different and/or additional messages and/or actions may be used.

Figure 5:
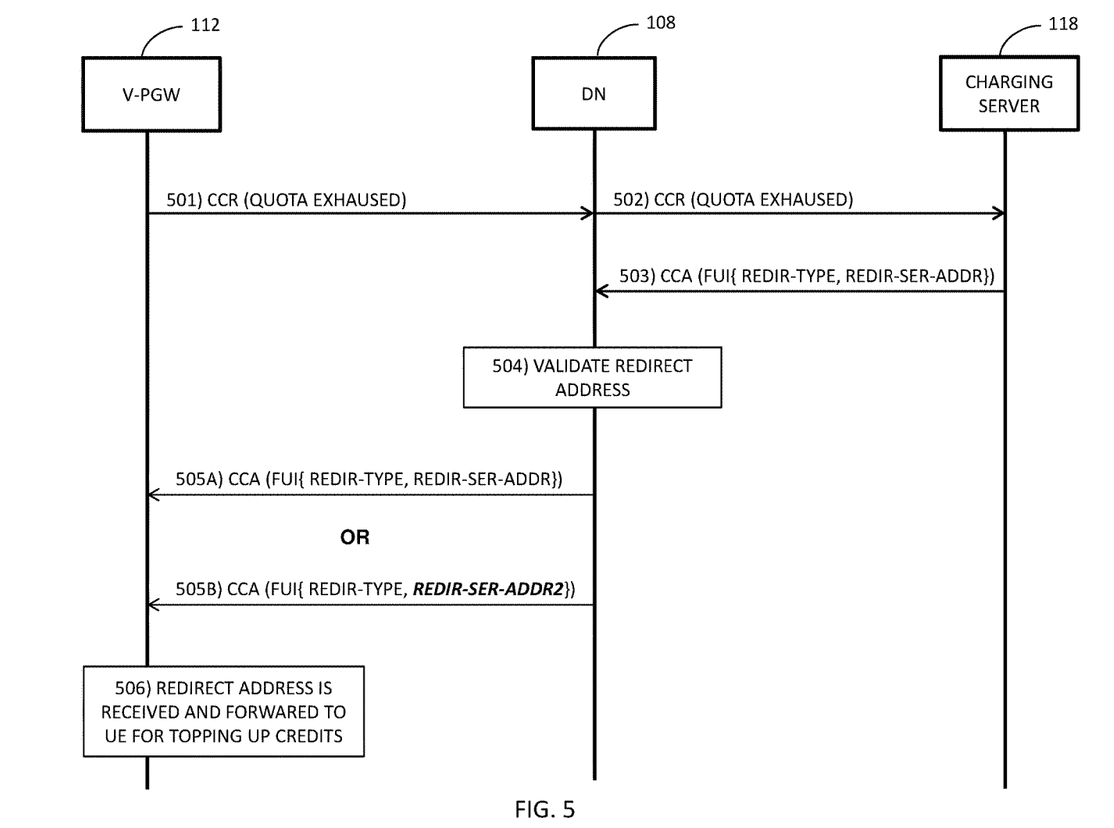
FIG. 5 is a diagram illustrating example Diameter messages associated with validating a redirect address while using an alternate roaming provider (ARP)

FIG. 5 is a diagram illustrating example Diameter messages associated with validating a redirect address while using an ARP. In some embodiments, UE 102 may be connected to Internet/IMS network 116 using V-PGW 112 in a visited network and may be charged credits based on some predetermined agreement. In such embodiments, during a call or session, if a UE 102 or related user exhausts or runs out of credits, V-PGW 112 may communicate with charging server 118 via DN 108 to obtain a redirect address and/or other information for communicating with top-up server 120 for recharging or topping up credits to continue the call or session.

Referring to FIG. 5, in step 501, a CCR message may be sent from V-PGW 112 to DN 108. For example, when a subscriber's credit quota is exhausted during a session with a node in Internet/IMS network 116, V-PGW 112 may send a CCA-U message to DN 108 destined for charging server 118.

In step 502, the CCR message may be sent from DN 108 to charging server 118. For example, DN 108 may route a CCR message to charging server 118 based on a subscriber identifier or other information.

In step 503, a CCA message may be sent from charging server 118 to DN 108. For example, after receiving a CCR message indicating that a credit quota is exhausted, charging server 118 may determine top-up server 120 should be contacted for obtaining additional credits. In this example, charging server 118 may generate and send a CCA message that includes a redirect address for communicating with top-up server 120.

In step 504, the CCA message may be received and validated at DN 108. For example, DN 108 or RAVE 202 therein may be configured to perform an address validation analysis (e.g., using one or more address validation algorithms) for determining whether the signaling message or address information therein is valid. Continuing with this example, depending on whether the redirect address is determined to be valid or invalid, DN 108 may perform one or more actions; e.g., modifying the message to replace an invalid redirect address with a valid redirect address before sending the message onward to V-PGW 112.

Steps 505A and steps 505B represent steps that may occur depending on whether the redirect address is valid or invalid. For example, if a redirect address is determined to valid in step 504, step 505A may occur. In another example, if a redirect address is determined to be invalid in step 504, step 505B may occur.

In step 505A, the CCA message may be sent from DN 108 to V-PGW 112 without modifying the redirect address. For example, after DN 108 or RAVE 202 determines that a redirect address in a Diameter message is valid, DN 108 may send the Diameter message to a destination with little or no modification to the redirect address.

In step 505B, the CCA message or a similar message may be modified to replace an invalid redirect address with a valid redirect address and then the CCA message or a similar message may be sent from DN 108 to V-PGW 112. For example, a network node may be configured to intercept a CCA message and may replace a valid redirect address for top-up server 120 with a redirect address for connecting to a server usable by a malicious actor to steal money or personal information from a subscriber. In this example, DN 108 or RAVE 202 may receive the CCA message and determine that the redirect address in the CCA message is invalid. Continuing with this example, DN 108 or RAVE 202 may modify the CCA message to replace the invalid redirect address with a valid redirect address for top-up server 120 before sending the CCA message to V-PGW 112.

In some embodiments, in response to determining that a redirect address in a Diameter message is invalid, the Diameter message may be discarded or sent to a network operator or a network management system for further analysis, e.g., instead of being routed to V-PGW 112. For example, a network node may be configured to send a fraudulent CCA message containing a redirect address for connecting to a server usable by a malicious actor to steal money or personal information from a subscriber. In this example, DN 108 or RAVE 202 may receive the CCA message and determine that the redirect address in the CCA message is invalid and, instead of sending the CCA message to V-PGW 112, DN 108 or RAVE 202 may discard the message or may notify a network operator or a network management system.

In step 506, the CCR message or a similar message may be received by V-PGW 112. In some embodiments, V-PGW 112 may forward or send a redirect address and/or other information to UE 102, where UE 102 may communicate with top-up server 120 for obtaining additional credits.

In some embodiments, where V-PGW 112 includes RAVE 202 or related functionality, V-PGW 112 or RAVE 202 therein may be configured to perform an address validation analysis (e.g., using one or more address validation algorithms) for determining whether the signaling message or address information therein is valid. In some embodiments, V-PGW 112 may forward or send the redirect address to UE 102 if the address information is determined to be valid. If the address information is determined to be invalid, V-PGW 112 may discard the signaling message, notify a network operator, and/or perform other mitigation actions.

In some embodiments, after obtaining additional credits, V-PGW 112 may notify charging server 118 about the additional credits and charging server 118 may notify V-PGW 112 to allow a credit-related traffic flow.

It will be appreciated that FIG. 5 is for illustrative purposes and that different and/or additional messages and/or actions may be used.

Figure 6:
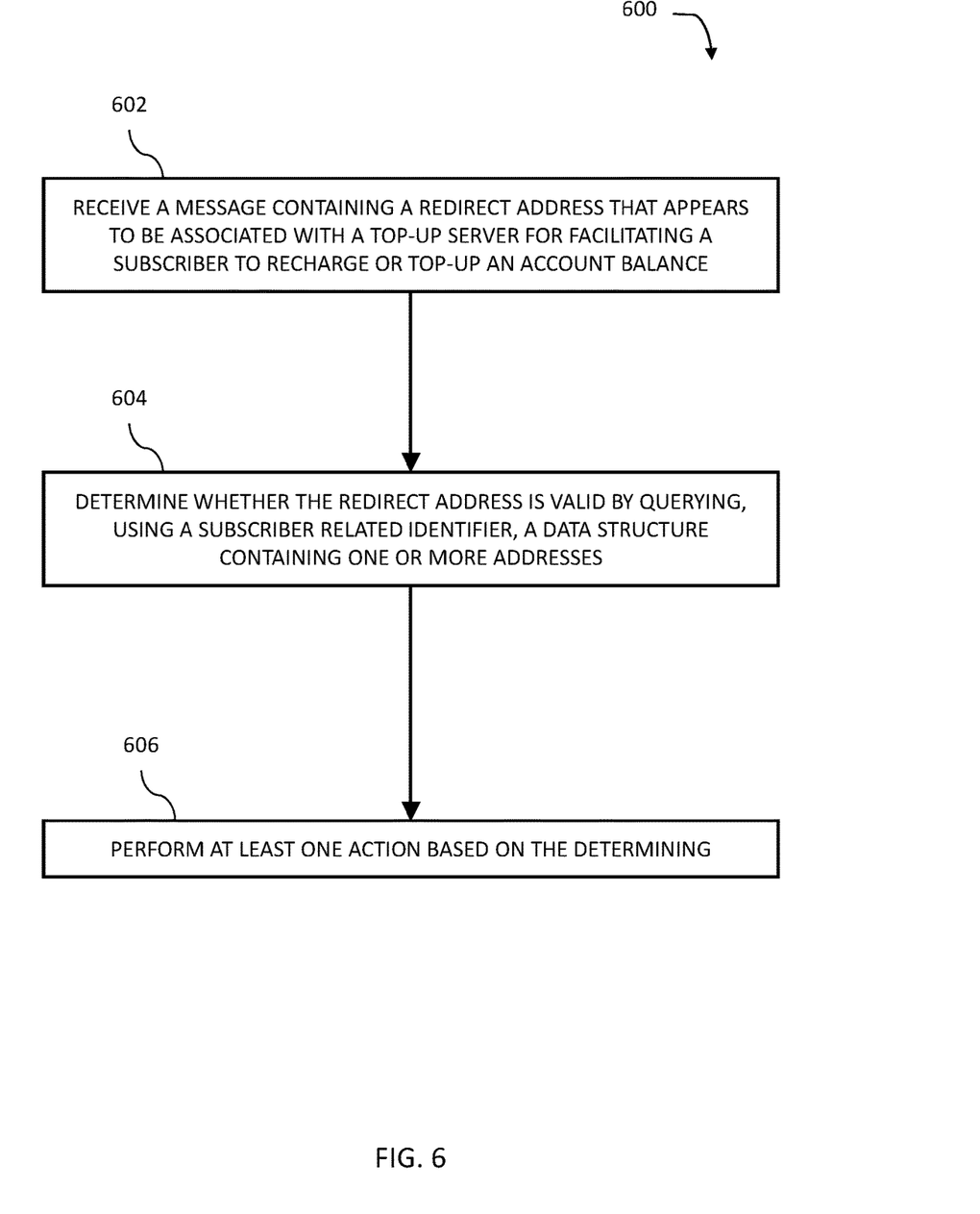
FIG. 6 is a diagram illustrating an example process for validating a redirect address in a Diameter message.

FIG. 6 is a diagram illustrating an example process 600 for validating a redirect address in a Diameter message. In some embodiments, example process 600 described herein, or portions thereof, may be performed at or performed by DN 108, RAVE 202, V-PGW 112, PGW 114, a Diameter node, and/or another module or node.

Referring to example process 600, in step 602, a message may be received containing a redirect address that appears to be associated with a top-up server for facilitating a subscriber to recharge or top-up an account balance. For example, DN 108 may receive a Diameter CCA-U message containing a SIP URI or a URL for communicating with top-up server 120.

In step 604, it may be determined whether the redirect address may be valid by querying, using a subscriber related identifier, a data structure containing one or more addresses. For example, DN 108 may query a data structure using a PLMN ID (e.g., a MCC and a MNC). In this example, each entry in the data structure may include a PLMN ID and one or more corresponding valid redirect addresses for communicating with one or more top-up servers, e.g., top-up server 120.

In step 606, at least one action may be performed based on the determining. For example, if a redirect address in a CCA message is valid, DN 108 may send the CCA message to PGW 114 without modifying the redirect address.

In some embodiments, performing at least one action may include in response to determining that a redirect address is invalid, modifying a message to replace the redirect address with a valid redirect address and sending the message to a PDN gateway (e.g., V-PGW 112 or PGW 114).

In some embodiments, a PDN gateway may include a PCEF.

In some embodiments, a Diameter node may include a DRA, a DEA, a PCEF, or a PDN gateway In some embodiments, a message containing a redirect address may include an FUI AVP, an FUA AVP, a redirect-server AVP, a redirect-address-type AVP, a redirect-server-address AVP, a Diameter message, a Diameter CCA message, a Diameter CCA-I message, or a Diameter CCA-U message.

In some embodiments, determining whether a redirect address is valid may include determining that the redirect address is valid by matching the redirect address with an address in a data structure, wherein the one or more addresses in the data structure are valid redirect addresses.

In some embodiments, determining whether a redirect address is valid may include determining that the redirect address is invalid by matching the redirect address with an address in a data structure, wherein the one or more addresses in the data structure are known invalid redirect addresses.

In some embodiments, a subscriber related identifier may include a network identifier, an MCC, an MNC, a LAC, a network identifier, a CGI, a BSID, an access node identifier, a CI, an SAC, a RAI, a RAC, a TAI, a TAC, an EGCI, a user device identifier, an IMEI, a phone number, or an IMSI.

In some embodiments, a message containing a redirect address may originate from an OCS, a charging server, or a PCRF.

In some embodiments, a redirect address may include an IP version 4 address, an IP version 6 address, a URL, or a SIP URI.

It should be noted that DN 108, V-PGW 112, PGW 114, RAVE 202, and/or functionality described herein may constitute a special purpose computing device. Further, DN 108, V-PGW 112, PGW 114, RAVE 202, and/or functionality described herein can improve the technological field of network security and/or fraud prevention. For example, by validating a redirect address in Diameter messages and performing one or more mitigating actions when a redirect address is determined to be invalid or likely to be invalid, malicious activities and their negative consequences (e.g., revenue fraud) can be avoided and/or prevented.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for validating a redirect address in a Diameter message, the method comprising:
   at a Diameter routing agent node:
   receiving a Diameter credit control message containing an attribute value pair (AVP), wherein the AVP includes a redirect address that appears to be associated with a top-up server for facilitating a subscriber to recharge or top-up an account balance, wherein the AVP includes a final unit indication AVP, a final unit action AVP, a redirect-server AVP, a redirect-address-type AVP, or a redirect-server-address AVP, and wherein the Diameter credit control message includes a Diameter credit control answer (CCA) message, a Diameter CCA initial (CCA-I) message, or a Diameter CCA update (CCA-U) message;
   determining whether the redirect address is valid by querying, using a subscriber related identifier, a data structure containing one or more redirect addresses; and
   performing at least one action based on the determining, wherein performing the at least one action includes determining that the redirect address is invalid, and, in response to determining that the redirect address is invalid, preventing the invalid redirect address from being received by a user device by modifying the Diameter credit control message to replace the invalid redirect address with a valid redirect address and sending the Diameter credit control message to a packet data network (PDN) gateway or by discarding the Diameter credit control message without sending the Diameter credit control message to the PDN gateway.

2. The method of claim 1 wherein determining whether the redirect address is valid includes determining that the redirect address is valid by matching the redirect address with an address in the data structure, wherein the one or more redirect addresses in the data structure are valid redirect addresses.

3. The method of claim 1 wherein determining whether the redirect address is valid includes determining that the redirect address is invalid by matching the redirect address with an address in the data structure, wherein the one or more redirect addresses in the data structure are known invalid redirect addresses.

4. The method of claim 1 wherein the subscriber related identifier includes a network identifier, a mobile country code (MCC), a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), an eUTRAN CGI (EGCI), a user device identifier, an international mobile station equipment identity (IMEI), a phone number, or an international mobile subscriber identity (IMSI).

5. The method of claim 1 wherein the Diameter credit control message originates from an online charging server (OCS), a charging server, or a policy and charging rules function (PCRF).

6. The method of claim 1 wherein the redirect address includes an Internet protocol (IP) version 4 address, an IP version 6 address, a uniform resource locator (URL), or a session initiation protocol (SIP) uniform resource identifier (URI).

7. A system for validating a redirect address in a Diameter message, the system comprising:
a Diameter routing agent node comprising:
at least one processor;
at least one communications interface; and
a memory,
wherein the Diameter routing agent node is configured for:
receiving, using the at least one communications interface, a Diameter credit control message containing an attribute value pair (AVP), wherein the AVP includes a redirect address that appears to be associated with a top-up server for facilitating a subscriber to recharge or top-up an account balance, wherein the AVP includes a final unit indication AVP, a final unit action AVP, a redirect-server AVP, a redirect-address-type AVP, or a redirect-server-address AVP, and wherein the Diameter credit control message includes a Diameter credit control answer (CCA) message, a Diameter CCA initial (CCA-I) message, or a Diameter CCA update (CCA-U) message;
determining whether the redirect address is valid by querying, using a subscriber related identifier, a data structure containing one or more redirect addresses; and
performing at least one action based on the determining, wherein performing the at least one action includes determining that the redirect address is invalid, and, in response to determining that the redirect address is invalid, preventing the invalid redirect address from being received by a user device by modifying the Diameter credit control message to replace the invalid redirect address with a valid redirect address and sending the Diameter credit control message to a packet data network (PDN) gateway or by discarding the Diameter credit control message without sending the Diameter credit control message to the PDN gateway.

8. The system of claim 7 wherein determining whether the redirect address is valid includes determining that the redirect address is valid by matching the redirect address with an address in the data structure, wherein the one or more redirect addresses in the data structure are valid redirect addresses.

9. The system of claim 7 wherein determining whether the redirect address is valid includes determining that the redirect address is invalid by matching the redirect address with an address in the data structure, wherein the one or more redirect addresses in the data structure are known invalid redirect addresses.

10. The system of claim 7 wherein the subscriber related identifier includes a network identifier, a mobile country code (MCC), a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), an eUTRAN CGI (EGCI), a user device identifier, an international mobile station equipment identity (IMEI), a phone number, or an international mobile subscriber identity (IMSI).

11. The system of claim 7 wherein the Diameter credit control message originates from an online charging server (OCS), a charging server, or a policy and charging rules function (PCRF).

12. The system of claim 7 wherein the redirect address includes an Internet protocol (IP) version 4 address, an IP version 6 address, a uniform resource locator (URL), or a session initiation protocol (SIP) uniform resource identifier (URI).

13. A non-transitory computer readable medium comprising computer executable instructions embodied in the non-transitory computer readable medium that when executed by at least one processor of at least one computer cause the at least one computer to perform steps comprising:
at a Diameter routing agent node:
receiving a Diameter credit control message containing an attribute value pair (AVP), wherein the AVP includes a redirect address that appears to be associated with a top-up server for facilitating a subscriber to recharge or top-up an account balance, wherein the AVP includes a final unit indication AVP, a final unit action AVP, a redirect-server AVP, a redirect-address-type AVP, or a redirect-server-address AVP, and wherein the Diameter credit control message includes a Diameter credit control answer (CCA) message, a Diameter CCA initial (CCA-I) message, or a Diameter CCA update (CCA-U) message;
determining whether the redirect address is valid by querying, using a subscriber related identifier, a data structure containing one or more redirect addresses; and
performing at least one action based on the determining, wherein performing the at least one action includes determining that the redirect address is invalid, and, in response to determining that the redirect address is invalid, preventing the invalid redirect address from being received by a user device by modifying the Diameter credit control message to replace the invalid redirect address with a valid redirect address and sending the Diameter credit control message to a packet data network (PDN) gateway or by discarding the Diameter credit control message without sending the Diameter credit control message to the PDN gateway.

* * * * *

UNITED STATES PATENT AND TRADEMARK OFFICE
CERTIFICATE OF CORRECTION

PATENT NO. : 10,237,721 B2  
APPLICATION NO. : 15/408155  
DATED : March 19, 2019  
INVENTOR(S) : Gupta et al.

Page 1 of 2

It is certified that error appears in the above-identified patent and that said Letters Patent is hereby corrected as shown below:

On the Title Page

On page 3, Column 1, Item (56) under Other Publications, Line 6, delete "DistrbuTECH,"" and insert -- DistribuTECH," --, therefor.

In the Drawings

On sheet 4 of 6, in FIG. 4, under Reference Numeral 401, Line 1, delete "EXHAUSED)" and insert -- EXHAUSTED) --, therefor.

On sheet 4 of 6, in FIG. 4, under Reference Numeral 402, Line 1, delete "EXHAUSED)" and insert -- EXHAUSTED) --, therefor.

On sheet 4 of 6, in FIG. 4, under Reference Numeral 406, Line 2, delete "FORWARED" and insert -- FORWARDED --, therefor.

On sheet 5 of 6, in FIG. 5, under Reference Numeral 501, Line 1, delete "EXHAUSED)" and insert -- EXHAUSTED) --, therefor.

On sheet 5 of 6, in FIG. 5, under Reference Numeral 502, Line 1, delete "EXHAUSED)" and insert -- EXHAUSTED) --, therefor.

On sheet 5 of 6, in FIG. 5, under Reference Numeral 506, Line 2, delete "FORWARED" and insert -- FORWARDED --, therefor.

In the Specification

In Column 9, Line 35, delete "(EGCI)," and insert -- (ECGI), --, therefor.

In Column 13, Line 42, after "gateway" insert -- . --.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,237,721 B2

In Column 13, Line 63, delete "EGCI," and insert -- ECGI, --, therefor.

In the Claims

In Column 15, Line 7, in Claim 4, delete "(EGCI)," and insert -- (ECGI), --, therefor.

In Column 16, Line 15, in Claim 10, delete "(EGCI)," and insert -- (ECGI), --, therefor.